Dec. 4, 1956 J. A. BOYAJEAN 2,773,163
HEATABLE ENGRAVING STYLUS ASSEMBLY
Filed Sept. 28, 1953

United States Patent Office 2,773,163
Patented Dec. 4, 1956

2,773,163

HEATABLE ENGRAVING STYLUS ASSEMBLY

John A. Boyajean, Huntington, N. Y., assignor to Fairchild Camera and Instrument Corporation, a corporation of Delaware Application September 28, 1953, Serial No. 382,821

4 Claims. (Cl. 219—29)

This invention relates to heatable engraving stylus assemblies and, while it is of general application, it is particularly adapted to stylus assemblies of the type used in photoelectric engraving apparatus, such as that described and claimed in applicant's prior Patent No. 2,575,546.

The engraving stylus presently used in photoelectric engravers of the type described in said Patent No. 2,575,546 comprises a solid metallic shank having one end fashioned to a suitable conical or pyramidal tip and surrounded by an electric heating coil electrically insulated from the stylus and heating the same principally by radiant heat. When engraving commercially available plastic plates of thermally decomposable material, such as cellulose nitrate, it is desirable to maintain the temperature of the tip of the engraving stylus at a relatively high and approximately uniform temperature under all operating conditions, that is, both when forming relatively shallow deformations corresponding to darker shades of an image and when forming deep deformations corresponding to highlights of the image.

It has been found advantageous to heat the engraving tip of a stylus of the type described to a temperature of the order of 1200° F. In order to obtain such a tip temperature, the heating coil is usually operated at a bright red heat of the order of 1800° F. It is, of course, desirable to maintain the stylus tip at an optimum temperature since, if it is under-heated, the stylus will tend to gouge rather than thermally decompose the plate material, whereas an over-heated stylus will tend to scorch or soften the plate and otherwise distort the plane printing surface. At the same time, the higher the temperature of the stylus tip is maintained, the faster the plate may be engraved.

In such a heated stylus, it is found that variations in the temperature of the engraving tip occur due to a number of causes. For example, the amount of heat dissipated at the stylus tip depends upon the average depth of penetration, that is, the amount of the plate material decomposed, and thus upon the average illumination of the portion of the image being reproduced. However, heat must flow from the stylus shank to the tip, so that there results a certain thermal gradient along the stylus which increases with heat demand at the tip, resulting in cooling of the tip at the very time that maximum temperature is desired. If it is attempted to reduce this temperature gradient, as by locating the heating coil near the tip, it is found that such a remedy is definitely limited due to the increased heating and softening of the surface of the engraving plate by heat radiated directly thereto by the heating coil.

There are also certain random variations in the temperature of the stylus tip due to the formation of oxide scale on the high temperature heating coil and the occasional chipping or flaking of this scale in use. These scale flakes occasionally lodge between the coil and the stylus and form an effective thermal shield, resulting in considerable variations in temperature of the tip between the times when a relatively thick scale is in place and times when portions of the bare coil are exposed after flaking. If it is attempted to improve the heat transfer by decreasing the separation between the stylus and its surrounding heating coil, these random variations are aggravated. As a result of these variations in temperature of the tip of an engraving stylus, it is usually customary to operate the tip at a no-load temperature of the order of 1200° F. to ensure that it does not fall below a practical operating value of the order of 900° F. under usual variations in operating conditions.

The present invention resides in a heatable engraving stylus assembly in which the heat necessary for engraving is generated directly in the engraving tip itself, avoiding the irregularities of transfer of heat to the tip from a surrounding heating coil and through the shank of the stylus to the engraving tip.

It is an object of the present invention, therefore, to provide a new and improved heatable stylus assembly which obviates one or more of the limitations of prior heatable engraving styli.

It is another object of the invention to provide a new and improved heatable engraving stylus assembly in which the engraving tip of the stylus is heated by heat generated directly in, or in the vicinity of, the engraving tip.

It is a further object of the invention to provide a new and improved heatable engraving stylus assembly by means of which the temperature of the engraving tip may be maintained approximately constant despite wide variations in operating conditions.

It is still another object of the invention to provide a new and improved heatable engraving stylus assembly which may be operated at an average temperature considerably lower than such devices of the prior art.

In accordance with the invention, a heatable stylus assembly for engraving a plate of thermally deformable material comprises a metallic shaft having a cylindrical portion terminating in a pyramidal tapered deforming tip and having a longitudinal slot extending into such tapered tip and having a tapered end complementary to the tapered tip and reducing the cross section thereof to a substantially uniform thickness which is a minor fraction of that of the slotted cylindrical portion, and means for causing an elctric current to flow through the shaft and through the slotted tapered tip thereof, whereby the heat generated by current flow is concentrated in the slotted tapered tip. The term "cylindrical" is used herein and in the appended claims in its generic sense to include bodies having cross sections of circular, polygonal or other desired shapes.

For a better understanding of the invention, together with other and further objects thereof, reference is had to the following description taken in connection with the accompanying drawing, while its scope will be pointed out in the appended claims.

Referring now to the drawing.

Figure 1:
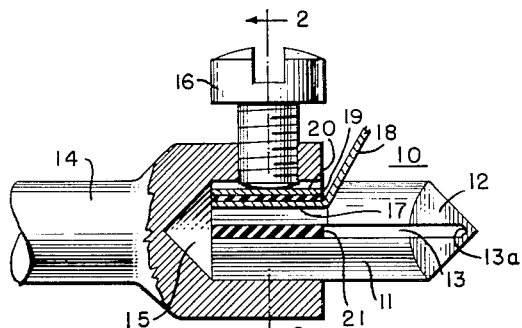
Fig. 1 is a longitudinal view, partly in section, of a heatable engraving stylus assembly embodying the invention.
Figure 3:
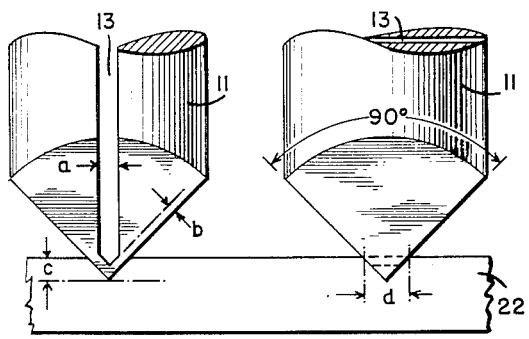
Figure 4:
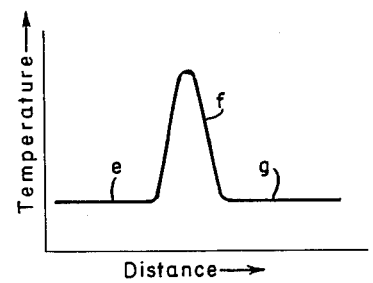
Figure 5:
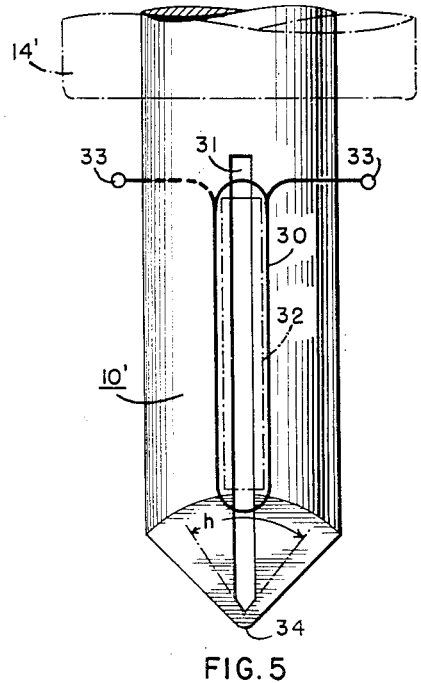
Figure 6:
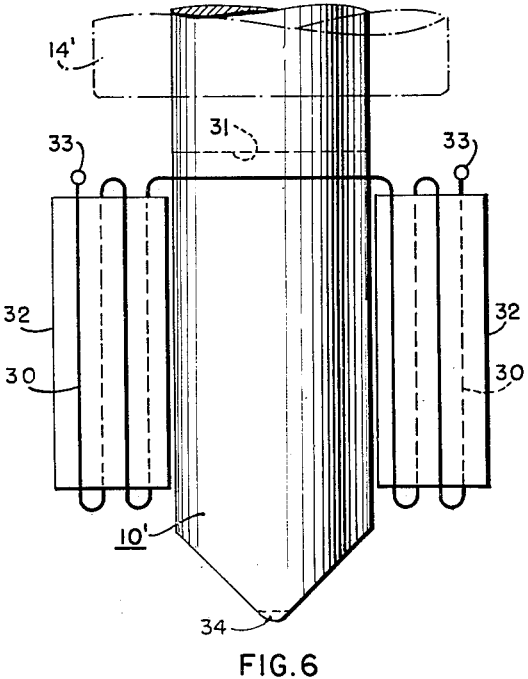

Fig. 3 comprises two elevational views of the stylus of Fig. 1 in planes normal to each other, showing certain dimensional details thereof;

Fig. 4 is a graph of an operating characteristic of the stylus of Fig. 1;

Fig. 5 is an elevational view of a modified form of heating stylus embodying the invention; while Fig. 6 is an elevational view of the stylus of Fig. 5 in a plane normal thereto.

Figure 2:
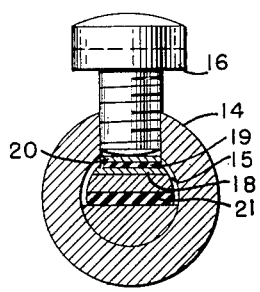
Fig. 2 is a cross-sectional view of the device of Fig. 1.

Referring now to Figs. 1 and 2 of the drawing, there is illustrated a heatable stylus assembly embodying the invention for engraving a plate of thermally deformable material, such as cellulose nitrate. This assembly includes a stylus comprising a metallic shaft 10 having a cylindrical portion 11 terminating in a tapered deforming tip 12 which, as shown, is in the form of a quadrilateral pyramid. The shaft 10 has a longitudinal slot 13 extending into the tapered tip 12 and having a tapered end 13a complementary to the tapered tip 12 and reducing the cross section of the tip at its engraving point to a substantially uniform thickness which is a minor fraction of that of the slotted cylindrical portion 11. The cross-sectional thickness of the reduced section at the engraving point of the tip 12 is of a value preferably of the order of 1/10 that of the cylindrical portion 11. The width of the slot 13 is preferably greater than the thickness of the reduced portion of tip 12. The slot 13 extends from the tapered point 13a through the other end of the cylindrical portion 11 to form spaced parallel shank portions.

The stylus assembly of the invention also includes means for causing an electric current to flow through the slotted shaft and through the slotted tapered tip portion thereof, whereby the heat generated by the current flow is concentrated in the slotted tapered tip. This latter means may take any of several well-known forms. For example, it may be in the form of a socket 14 having a cylindrical recess 15 slightly exceeding the area of the cylindrical portion 11 of the stylus and including provisions for making individual electrical contacts with the shank portions of the cylindrical portion 11 of the stylus to pass an electric current through these shank portions and the slotted tapered tip. To this end, the socket 14 is provided with a clamping screw 16 and one of the shank portions is flattened as at 17 for receiving therebetween a connecting lead such as a copper strip 18. A strip of insulation material 19 and a metal bearing strip 20 are interposed between the set screw 16 and conductive strip 18 to insulate the conductive strip 18 and its associated shank portion from the socket. A spacing strip 21 of insulation material is inserted in the slot 13 remote from the tip portion 12 to permit a firm clamping of the stylus 10 in the socket 14 and at the same time establishing an electric contact between the lower shank portion 11 and the socket to complete electrical connections for passing current through the shank portions 11 and the tip portion 12 of reduced section.

While it is apparent that the relative dimensions and constants of the stylus assembly of Fig. 1 may be varied within wide limits in accordance with the operating conditions and requirements, there follow the specifications of one satisfactory design represented in more detail in Fig. 3, in which the stylus is shown in the position of maximum penetration of a plastic engraving plate 22:

Stylus shaft 10 _____ 3/32 inch rod of refractory alloy metal comprising essentially 44% cobalt, 33% chromium, 17% tungsten, and 2 1/4 % carbon and commercially available under the trademark "Rexalloy" from the Crucible Steel Company.
Tip portion 12 _____ 90° quadrilateral pyramid.
Slot 13, width a _____ 0.01 inch.
Reduced tip portion:
    Thickness b _____ 0.005 inch.
    Cross section area _____ 0.00075 square inch.
Shank portions 11,
    cross section area _____ 0.004 square inch.
Stylus socket 14, outer
    diameter _____ 0.093 inch.
Copper lead strip 18,
    thickness _____ 0.007 inch.
Maximum penetration:
    Depth c _____ 0.01 inch.
    Area d _____ 0.0004 square inch.

The temperature gradient along the developed length of the stylus is represented by the curve of Fig. 4. In this curve the portion $e$ represents the temperature over the upper shank portion between the lead-in conductor 18 and the portion of the tip 12 of reduced section. The steeply peaked portion $f$ represents the temperature gradient over the length of the portion of reduced section, while the portion $g$ represents the temperature over the lower shank portion between the tip of reduced section and the socket 14. It will be noted that, while the cross-sectional thickness of the portion of reduced section is substantially uniform over its length, the temperature varies substantially, due to the flow of heat from the high temperature point in both directions into the shank portions 11 of greater thermal capacity.

It will be clear that, with the heatable stylus assembly of Figs. 1 and 2, the maximum temperature is developed at the actual engraving point of the tip portion where it is required for effecting thermal decomposition of the engraving plate. At the same time, the shank portions 11 and the portion of the tip 12 of larger area operate at much lower temperature so that heating of the engraving plate in the vicinity of the elemental area being deformed is minimized.

In Figs. 5 and 6 there is represented a modified form of heatable stylus assembly, in which the means for causing an electric current to flow through the shaft and through the tip portion of reduced section is in the form of a magnetizing winding 30 of approximately rectangular cross section and approximately coaxial with the slot 31 of a stylus 10' disposed in a socket 14'. In this case, the slot 31 does not extend the full length of the shank portion of the stylus 10', so that a closed conductive path is formed around the periphery of the slot. The coaxial magnetizing winding 30 is effective to induce a circulating current around the slot, that is, through the shaft and the slotted tapered tip portion. If desired, the winding 31 may be provided with ferromagnetic cores 32, 32 disposed on opposite sides of the stylus 10'. The winding 30 is energized from supply terminals 33, 33 connected to any suitable source of relatively high-frequency alternating current. The frequency of the current supplied to the terminals 33, 33 will depend upon the nature of the ferromagnetic cores 32, 32, if used, the lower the losses of the core elements, the higher the frequency that may be used. At the same time, it is preferable to avoid the use of magnetizing currents of too high a frequency, since they result in a concentration of the induced current in the stylus near the surface portions thereof rather than in uniform distribution throughout the body of the stylus. If the current is thus concentrated in the surface portion of the stylus, the concentration of the heat in the engraving tip of reduced section is somewhat reduced. The stylus 10' of the assembly of Figs. 5 and 6 is somewhat modified in that the engraving tip portion 34 is blunted, while the taper angle $h$ of the end of the slot 31 is 53° so that the cross-sectional thickness of the reduced tip portion is no longer uniform but serves further to concentrate the developed heat at the engraving point of the stylus.

Thus, the improved heatable engraving stylus assembly of the invention eliminates the external surrounding heating coil which, in such prior devices, has proven a source of trouble because of frequent burn-out and because of irregular heat transfer from the coil to the engraving tip due to scaling and flaking. Furthermore, the elimination of the external heating coil avoids the radiation of heat directly from the coil to the surface of the plastic plate being engraved and the consequent damage to the printing surface of the plate.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A heatable stylus assembly for engraving a plate of thermally deformable material comprising: a metallic shaft having a cylindrical portion terminating in a pyramidal tapered deforming tip and having a longitudinal slot extending into said tapered tip and having a tapered end complementary to the tapered tip and reducing the cross section thereof to a substantially uniform thickness of the order of $\frac{1}{10}$ that of the slotted cylindrical portion; and means for causing an electric current to flow through the shaft and through said slotted tapered tip thereof, whereby the heat generated by current flow is concentrated in said slotted tapered tip.

2. A heatable stylus assembly for engraving a plate of thermally deformable material comprising: a metallic shaft having a cylindrical portion terminating in a pyramidal tapered deforming tip and having a longitudinal slot extending into said tapered tip and having a tapered end complementary to the tapered tip and reducing the cross section thereof to a substantially uniform thickness which is a minor fraction of that of the slotted cylindrical portion; and means for causing an electric current to flow through the shaft and through said slotted tapered tip thereof, whereby the heat generated by current flow is concentrated in said slotted tapered tip.

3. A heatable stylus assembly for engraving a plate of thermally deformable material comprising: a metallic shaft having a cylindrical portion terminating in a tapered deforming tip and having a longitudinal slot extending into said tapered tip and having a tapered end complementary to the tapered tip and reducing the cross section thereof to a substantially uniform thickness which is a minor fraction of that of the slotted cylindrical portion; and a magnetizing winding approximately coaxial with said slot for inducing a circulating current through the shaft and through said slotted tapered tip thereof, whereby the heat generated by current flow is concentrated in said slotted tapered tip.

4. In a heatable stylus assembly for engraving a plate of thermally deformable material and including a heating-current supply circuit, a stylus comprising: a metallic shaft having a cylindrical portion terminating in a pyramidal tapered deforming tip and having a longitudinal slot extending into said tapered tip and having a tapered end complementary to the tapered tip and reducing the cross section thereof to a substantially uniform thickness which is of the order of $\frac{1}{10}$ that of the slotted cylindrical portion, whereby the heat generated by current flow through the shaft and through said slotted tapered tip thereof is concentrated in said slotted tapered tip.

References Cited in the file of this patent

UNITED STATES PATENTS

| | | |
|---|---|---|
| 508,284 | Coffin | Nov. 7, 1893 |
| 1,792,688 | Graff | Feb. 17, 1931 |
| 1,834,555 | Tittle | Dec. 1, 1931 |
| 2,101,913 | Meyer | Dec. 14, 1937 |
| 2,359,393 | Sloan | Oct. 3, 1944 |
| 2,397,348 | Haines et al. | Mar. 26, 1946 |
| 2,491,931 | Raker et al. | Dec. 20, 1949 |
| 2,501,192 | Scholler | Mar. 21, 1950 |